UNITED STATES PATENT OFFICE.

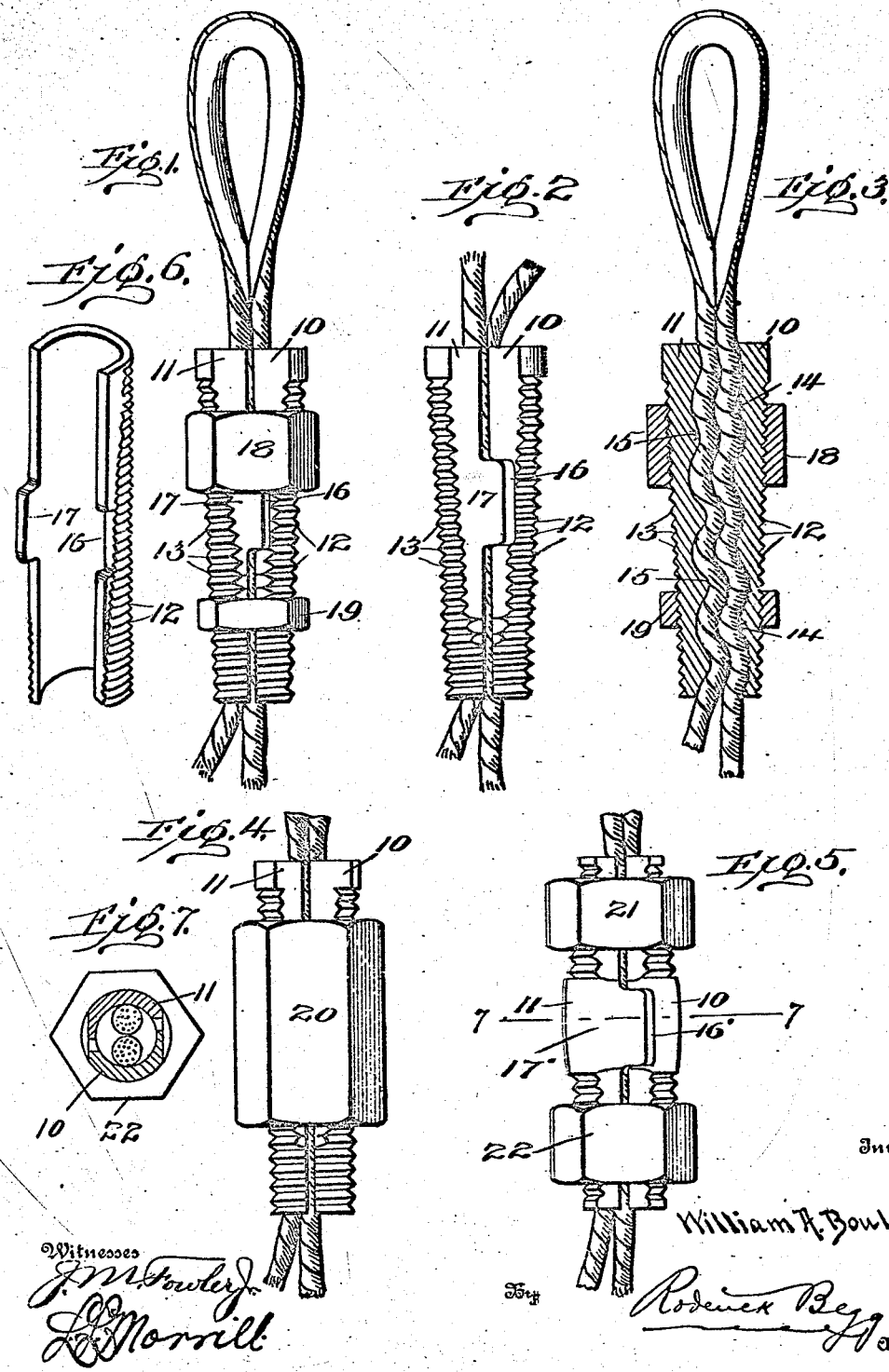

WILLIAM A. BOULTER, OF CONGERS, NEW YORK, ASSIGNOR OF ONE-HALF TO JOHN H. STILL-WAGGON AND JOHN J. BECHTOLD, OF NEW YORK, N. Y.

ROPE-CLAMP.

No. 895,065.  Specification of Letters Patent.  Patented Aug. 4, 1908.

Application filed April 18, 1907. Serial No. 368,953.

*To all whom it may concern:*

Be it known that I, WILLIAM A. BOULTER, a citizen of the United States, residing at Congers, in the county of Rockland and State of New York, have invented certain new and useful Improvements in Rope-Clamps, of which the following is a specification.

This invention relates to rope clamps and has for an object to provide improved means for clamping a rope either to produce a loop or to join broken ends.

A further object of the invention is to provide a clamp having an interior sinuous passage in order that the rope may be firmly gripped.

With these and other objects in view, the invention comprises certain novel constructions, combinations and arrangements of parts, as will be hereinafter fully described and claimed.

In the drawings:—Figure 1 represents the improved rope clamp embodying two clamping nuts and illustrated as used to form a rope loop. Fig. 2 is a view of the improved rope clamp with the clamping nuts removed exhibiting the clamping members and used to splice severed rope ends. Fig. 3 is a longitudinal, sectional view of the improved rope clamp with rope strands in position. Fig. 4 is a view in side elevation of a slightly different embodiment of the improved rope clamp. Fig. 5 is a view in side elevation of still a different embodiment of the improved rope clamp. Fig. 6 is a perspective view of a clamping member embodying the features of the present invention. Fig. 7 is a section through Fig. 5 on line 7—7.

Like characters of reference designate corresponding parts throughout the several views.

The improved rope clamp forming the subject-matter of this application comprises a pair of clamp members 10 and 11, tapered externally throughout their lengths and provided with external screw threads as 12 and 13, respectively.

Internally the associated clamping members are provided with a sinuous passage produced by abutments 14 and 15 formed, respectively, upon the members 10 and 11 and in staggered relation as more plainly indicated in Fig. 3, whereby the rope is clamped in a sinuous or waved position.

To position the members 10 and 11 longitudinally, one of said members, as 10, is provided with a recess 16, while the other member, as 11, is provided with a tongue or offset 17 which is proportioned to fit within the recess 16, as shown particularly in Figs. 1 and 2. It is to be understood that the recesses and tongues, shown at 16 and 17, in Figs. 1 and 2, may be and are usually formed similarly upon opposite sides of the device.

Upon the tapered members 10 and 11 are positioned clamping means as the nuts 18 and 19, the former being the nut adapted to exert the greater amount of pressure and being larger while the latter is intended to exert some clamping force but principally to hold together and in position the smaller ends of the tapered members 10 and 11. It is, of course, obvious that the nuts 18 and 19 will be tapered internally and screw-threaded to correspond with and interengage upon the tapered threaded surface of the members 10 and 11. Instead of employing the two nuts 18 and 19, it is obvious that a single long nut, as 20, may be employed as shown at Fig. 4, embracing a considerable portion of the length of the clamping members and thereby strengthening and adding to the rigidity and reliability of the members. It is also obvious that the members may be formed tapered at both ends as shown at 10' and 11' in Fig. 5, with clamping nuts, as 21 and 22, adjusted upon each end of the device. With the members tapered from both ends, as shown in Fig. 5, the means as the recess 16 and tongue 17 will be formed in the center of the device here shown as 16' and 17'. In operation the ends of the ropes to be united will be laid beside each other and the clamping members disposed upon the ends with one of the ropes seated in each of the members 10 and 11. Before the ropes are overlapped, the nuts 18 and 19 or the nuts 21 and 22 or the nut 20, according to the particular embodiments of the invention employed, are preferably placed upon the rope, whereupon the clamping members are positioned as above described and the nuts clamped upon the clamping members, all being turned with a wrench or any approved implement.

What I claim is:—

A rope clamp comprising similar opposing clamping members, each embodying a recess upon one side, and a complementary lug member upon the opposite side, and means movable longitudinally of such clamping members adapted to force the said jaw members toward each other.

In testimony whereof I affix my signature in presence of two witnesses.

WILLIAM A. BOULTER.

Witnesses:
ARCHIBALD L. VAN NESS,
WALTER A. VAN NESS.